3,766,134
ABS COMPOSITIONS FOR ELECTROPLATING
WHICH CONTAIN ASBESTOS
Girish T. Dalal, Westlake, Ohio, assignor to The
B. F. Goodrich Company, New York, N.Y.
No Drawing. Continuation-in-part of application Ser. No. 193,697, Oct. 29, 1971. This application Oct. 13, 1972, Ser. No. 297,249
Int. Cl. C08f 45/10
U.S. Cl. 260—41.5 A       3 Claims

ABSTRACT OF THE DISCLOSURE

Improved ABS compositions for electroplating are provided which contain small amounts of asbestos for use in metal plated applications involving exposure to extreme variations in temperature and humidity. Metal plated articles of these compounds have satisfactory adhesion of metal to substrate and improved performance under extreme temperature conditions.

CROSS REFERENCE TO RELATED APPLICATION

This is a continuation-in-part of my copending application Ser. No. 193,697, filed Oct. 29, 1971, now abandoned.

BACKGROUND OF THE INVENTION

Electroplated ABS articles are used in a number of applications after metal plating the surface. However, the use of metal plated ABS articles has been generally limited to interior applications, since such plated materials are extremely sensitive to the environmental extremes of heat and cold. Many ABS metal plated parts exhibit failures in the form of blisters and cracking of the plate on exposure to hot-cold thermal cycling. There is need for improved ABS compounds that can be readily electroplated with metals and have improved thermal cycling performance for outdoor applications.

SUMMARY OF THE INVENTION

Molded ABS compositions that are readily electroplated to provide metal plated ABS parts having improved coefficient of linear thermal expansion and thermal cycling resistance as to the plated substrate contain less than 10 weight parts of asbestos per 100 weight parts of ABS.

DETAILED DESCRIPTION

ABS compounds containing small amounts of asbestos, when electroplated, have an improved overall balance of properties for outdoor uses because of reduced thermal expansion, less tendency to orient during molding and acceptable plate adhesion. Compounds containing asbestos may be handled in injection molding operations in the same manner as other ABS injection molding compounds. Incorporation of asbestos also reduces the susceptibility of electroplating compounds to variations in the pre-plating system. Performance in various types and concentrations of etch systems is more uniform and improved. The coverage of the parts by metal is also improved by incorporation of these small amounts of asbestos.

ABS plastics are well known molding resins. Such resins are generally referred to as graft copolymers. Typical preparations are described, for example, in U.S. Pats. 3,238,275; 2,948,703; 2,820,773; 3,222,422; 2,908,661; 2,802,808; 3,074,906; 3,010,936; and 3,168,593. The resins are readily obtained by polymerizing styrene and acrylonitrile in the presence of a conjugated diene polymer, usually polybutadiene. The ABS polymers are generally a mixture of rubber particles dispersed in a styrene-acrylonitrile matrix, at least a part of the styrene and acrylonitrile usually being grafted onto the elastomeric polybutadiene backbone. These graft polymers, as is fully described in the literature, are prepared from mixtures of vinyl cyanides as acrylonitrile and methacrylonitrile and vinyl aromatic compounds as styrene, methyl styrene, vinyl toluene and the like, with a conjugated diolefin polymer latex as polybutadiene, or elastomeric butadiene copolymers of butadiene-styrene, butadiene-acrylonitrile, butadiene-alkyl acrylates and the like. Alkyl methacrylates as methyl methacrylate may be used in addition to, or in place of, acrylonitrile and styrene if desired.

Proportions of monomers normally used are about 40 to 90% of combined nitrile and vinyl aromatic with about 60 to 10 parts of diene elastomer. The acrylonitrile preferably is from about 10 to 40% by weight of the three components, the styrene 30 to 80% by weight and the butadiene about 10 to 60% by weight. Blends of ABS resins with other polymers as vinyl chloride polymers, styrene polymers, methyl methacrylate polymers, polyurethanes, polycarbonates, and the like may also be used. In essence, any ABS plating grade compound that a metal may be deposited by an electroplating process on the surface is improved in accordance with this invention.

The asbestos used may be any of those powder or fibrous asbestos known to those skilled in the art. There are generally two types of asbestos, and these are derived from serpentine and amphiboles. The asbestos may be used in the form of powdered asbestos or in fibrous forms. When fibers are used they may be difficult to disperse and mold if the fibers are too long. Better results are generally obtained when the asbestos fiber is less than about one inch average in length, and normally fibers less than ¾", as in length down to, for instance, ½₂" or finer, may be employed. It is generally preferred to use fibrous asbestos rather than powdered asbestos, although either provides improvement in ABS compositions prepared for electroplating. Good quality asbestos is preferred, particularly that have been cleaned of impurities and have had the fibers separated. The amount of asbestos used in the ABS is less than 10 weight parts. Improvement in both the plating surface and resistance to thermal cycling are obtained with even a few tenths part of asbestos. Good results have been obtained in the range of about 0.1 to 5 weight parts of asbestos per 100 weight parts of ABS resin. Preferred are amounts from about 1 to 4 parts. As to the aspect ratio, length/diameter ratio, of asbestos fiber, it has generally been found that when this is less than about 2000, preferably 1000 to about 10 to 20, excellent results are obtained.

The essential material to obtain the advantages of this invention is asbestos. In addition to asbestos, the ABS compound may contain any of the other compounding ingredients used by those skilled in the art to provide improved electro-plating compounds. Such additives include other polymers and resins, stabilizers, coloring agents, fillers, reinforcing agents, processing aids and the like. These other ingredients may be mixed with the ABS resin by any of the standard compounding techniques. One convenient method is to mix all of the compounding ingredients in an internal mixer and extrude in the form of pellets of about ⅛" x ⅛" size, for ease of later molding into articles. Injection molding of articles for later plating is satisfactory.

Molded ABS parts are normally electroplated by standard plating techniques. This normally involves cleaning, etching, as with chromic acid and neutralizing, sensitization and activation, deposition of a conductive metal coating as copper or nickel by an electrochemical (electroless) reaction process. Two electroplating systems for ABS are described in Chemical and Engineering News, Mar. 6, 1967, page 24 and Chemical and Engineering News, June 13, 1966, pages 80–82. To determine the adhesion of the metal to the surface of the ABS, the pull required to separate the metal plating from the plastic surface is reported in terms of pounds of pull/linear inch.

To demonstrate the advantages of the invention, 100 weight parts of an ABS polymer containing 15% butadiene, about 26% acrylonitrile and 59% styrene, was mixed in an internal mixer with 0.005 part of carbon black, 0.5 part of titanium dioxide, 0.014 part of blue pigment, and varying amounts of refined chrysotile asbestos, having an aspect ratio of about 200:1, diameter of .025 micron, and bulk density of 4 lb./in. ft., shown in the data table given below. Test specimens were injection molded and physical properties of molded plaques of this compound were determined.

| Sample No. | 1 | 2 | 3 |
| --- | --- | --- | --- |
| Asbestos, wt. parts | 1 | 3 | 5 |
| Tensile strength, p.s.i. | 6,000 | 6,350 | 6,833 |
| Tensile modulus, p.s.i. $\times 10^3$ | | 450 | 498 |
| Percent elongation | 17.0 | 13.0 | 16.5 |
| Flex strength, p.s.i. $\times 10^3$ | | 12.45 | 13.5 |
| Flex modulus, p.s.i. $\times 10^3$ | | 441 | 524.4 |
| M.I. at 225° C. gm./10 min | 17.95 | 14.17 | 11.44 |
| CLTE $\times 10^{-5}$, in./in./° C | 8.190 | 6.920 | 6.280 |
| HDT, 264 p.s.i., 1/8", ° F | 175.1 | 181.4 | 184.6 |
| Specific gravity, gm./ml | | 1.069 | 1.080 |
| Mold shrinkage, in./in. | | Nil | Nil |
| Percent orientation shrinkage | 21.52 | 17.26 | 15.07 |

The composition containing three parts of asbestos provides the best balance of desirable physical properties. The surface of parts molded from this compound had very good appearance. Molded plaques were nickel-copper plated in accordance with the procedures described above, first coating the plaque with electroless nickel, followed by electrolytic nickel strike and then 1.5 mils of copper. The plated plaques were annealed at 180° F. for one hour. Plate adhesion was determined on 1" wide strips. Values obtained were:

Plate adhesion, lbs./in.:
Unannealed _____ 11       9      5
Annealed _____ 12.5    10      5.3

The metal plating on these plaques was satisfactory as shown in a thermal cycling test found in "Standards and Guidelines for the American Society of Electroplated Plastics." These data demonstrate that the use of asbestos in these small amounts significantly lowers the percent coefficient of linear expansion (CLTE) that is desirable in applications involving thermal cycling, orientation shrinkage is reduced and the heat distortion temperature (HDT) is raised, without affecting other important physical properties relating to plating and adherence of the plate, such as adhesion surface characteristics.

Another series of compounds were prepared using an ABS commercial resin prepared by polymerizing 82 parts of styrene and acrylonitrile (70/30) in the presence of butadiene latex containing 18 parts of polybutadiene. When this was compounded in the recipe given above and nickel-copper plated, the CLTE was 6.71, percent orientation shrinkage 6.71 and adhesion in lb./in. 8.0.

In another compound 20 parts of polyvinyl chloride was mixed with 80 parts of the ABS resin of Example I, and the amounts of asbestos in weight parts shown in the table.

| | 1 | 2 | 3 |
| --- | --- | --- | --- |
| Asbestos | 0 | 1.0 | 3.0 |
| Physical properties: | | | |
| Tensile strength, p.s.i. | 5,475 | 5,550 | 5,570 |
| Percent elongation | 77 | 27 | 15 |
| M.I. at 225° C., gm./10 min | 27.85 | 23.50 | 20.25 |
| HDT, 264 p.s.i., 1/8", ° F | 173.3 | 174.2 | 176.0 |
| Percent orientation shrinkage | 20.78 | 17.86 | 15.70 |
| CLTE, $\times 10^{-5}$ in./in./° C | 8.62 | 8.03 | 7.05 |
| Plate adhesion, lbs./in.: | | | |
| Unannealed | 12.75 | 10.75 | 8.75 |
| Annealed | 13.25 | 10.50 | 10.25 |

As demonstrated above, asbestos lowered the coefficient of linear thermal expansion, the percent orientation shrinkage and such compounds have acceptable (copper-nickel)-plastic surface adhesion.

To demonstrate that a variety of types of asbestos may be used, a series of compounds using the recipe of Example I were prepared with 3 parts each of fine, medium 1/8-3/8" length and coarse large fiber bundles of asbestos no longer than about 3/4" average. The physical properties obtained were:

| | 1 | 2 | 3 |
| --- | --- | --- | --- |
| M.I. at 225° C., 8,700 gm., gm./10 min | 15.75 | 15.25 | 15.91 |
| HDT, 264 p.s.i., unannealed, ° F | 179.6 | 177.8 | 178.7 |
| Percent orientation shrinkage | 20.1 | 19.8 | 17.7 |
| CLTE, in./in./° C. $\times 10^{-5}$ | 7.02 | 7.56 | 7.31 |
| Plate adhesion, lb./in. | 12.5 | 12.0 | 9.5 |
| Nature of asbestos fibers | Fine | Medium | Coarse |

To demonstrate that 10 or more weight parts of asbestos are unsatisfactory for metal coating operations on molded articles, a compound was prepared in accordance with example (Col. 3) containing, however, 10 weight parts of asbestos. The Izod impact was only 0.51 and plate adhesion only 2.3 lb./in. With one weight part of asbestos the Izod impact was 2.29 and plate adhesion was 12.5 lb./in. With larger amounts of asbestos as 15 to 20 weight parts, plate adhesion is further decreased and the surface of molded compositions is unsatisfactory for plating and appearance. One part of available glass fibers substituted for asbestos in the same compounds ruins the surface of molded plaques of such compositions for molded and plated applications.

Plated molded articles of the compounds of this invention find use in interior and exterior applications in appliances, plumbing fixtures and automobile trim.

I claim:
1. A solid thermoplastic acrylonitrile-butadiene-styrene graft copolymer molding resin composition having a nickel-copper metal plated adhesion value of greater than 5.0 lb./in. comprising about 40 to 90 weight percent combined vinyl aromatic and vinyl cyanide or alkyl methacrylate grafted on a conjugated diene polymer, said vinyl aromatic being present in amount from about 30 to 80 weight percent, said vinyl cyanide or alkyl methacrylate being present in amount from about 10 to about 40 weight percent, and said conjugated diene being present in amount from about 10 to 60 weight percent, about 10 to 30 weight parts of a vinyl chloride polymer per 100 weight parts of acrylonitrile-butadiene-styrene polymer and about 0.1 to 4 weight parts of asbestos per 100 weight parts of said acrylonitrile-butadiene-styrene graft copolymer, the fibers of said asbestos having an average from about 1/32" to about 3/4" and having an aspect ratio from above 10 to less than 2000.

2. A composition of claim 1 wherein the vinyl aromatic is styrene, the vinyl cyanide is acrylonitrile and the diene is butadiene.

3. A composition of claim 1 wherein the vinyl aromatic is styrene, the alkyl methacrylate is methyl methacrylate and the diene is butadiene.

References Cited
UNITED STATES PATENTS 3,474,048   10/1969   Chappelear _____ 260—41.5 A
3,503,919    3/1970   Cadus _____ 260—41.5 A
2,948,703    8/1960   Schroeder _____ 260—45.5

MORRIS LIEBMAN, Primary Examiner

P. R. MICHL, Assistant Examiner

U.S. Cl. X.R.
117—138.8 UA; 204—30